United States Patent
Shinkai et al.

(10) Patent No.: US 11,208,620 B2
(45) Date of Patent: Dec. 28, 2021

(54) BEER-FLAVORED BEVERAGE, METHOD FOR PRODUCING BEER-FLAVORED BEVERAGE, AND METHOD FOR IMPARTING EXCELLENT RICHNESS AND QUALITY OF AFTERTASTE TO BEER-FLAVORED BEVERAGE

(71) Applicant: Sapporo Breweries Limited, Tokyo (JP)

(72) Inventors: Tetsuro Shinkai, Tokyo (JP); Yuta Matsui, Tokyo (JP); Yoichi Kozaki, Tokyo (JP)

(73) Assignee: Sapporo Breweries Limited, Tokyo (JP)

( * ) Notice: Subject to any disclaimer, the term of this patent is extended or adjusted under 35 U.S.C. 154(b) by 0 days.

(21) Appl. No.: 16/337,178

(22) PCT Filed: Jun. 30, 2017

(86) PCT No.: PCT/JP2017/024132
§ 371 (c)(1),
(2) Date: Mar. 27, 2019

(87) PCT Pub. No.: WO2018/061370
PCT Pub. Date: Apr. 5, 2018

(65) Prior Publication Data
US 2020/0032180 A1    Jan. 30, 2020

(30) Foreign Application Priority Data

Sep. 30, 2016  (JP) .............................. JP2016-192928

(51) Int. Cl.
*C12C 5/02* (2006.01)
*C12C 7/20* (2006.01)
*C12C 12/04* (2006.01)
*C12C 11/00* (2006.01)
*C12C 12/02* (2006.01)
*C12C 11/06* (2006.01)

(52) U.S. Cl.
CPC .............. *C12C 5/026* (2013.01); *C12C 7/205* (2013.01); *C12C 11/003* (2013.01); *C12C 11/06* (2013.01); *C12C 12/02* (2013.01); *C12C 12/04* (2013.01)

(58) Field of Classification Search
CPC ....... C12C 5/026; C12C 7/205; C12C 11/003; C12C 12/04; C12C 12/02; C12C 11/06

USPC ................................................... 426/106, 16
See application file for complete search history.

(56) References Cited

U.S. PATENT DOCUMENTS

| 2008/0131555 A1* | 6/2008 | Izumi | C12C 11/003 426/16 |
| 2008/0138466 A1* | 6/2008 | Kishinami | C12C 1/02 426/16 |
| 2012/0021110 A1* | 1/2012 | Katayama | A23L 27/2026 426/534 |

FOREIGN PATENT DOCUMENTS

| JP | 2012-105673 A | 6/2012 |
| JP | 2014-166169 A | 9/2014 |
| JP | 2016-149975 A | 8/2016 |
| WO | 2005/121304 A1 | 12/2005 |
| WO | 2009/051127 A1 | 4/2009 |
| WO | 2011/158395 A1 | 12/2011 |

OTHER PUBLICATIONS

Takaaki et al. (WO 2009/051127) [English Translation of this article], (Year: 2009).*
NPL Blanka et al. (in Int. J. Food Sci. Nutr. 65(6): 655-680, 2014). (Year: 2014).*
International Search Report issued in corresponding International Patent Application No. PCT/JP2017/024132 dated Aug. 8, 2017.
Sapporo Breweries Ltd, "Sapporo Mugi to Hop Platinum Clear," Hatsubai News Release, http://www.sapporobeer.jp/news_release/0000021310/ (2016) (see partial English translation).
Sapporo Breweries Ltd, "List of Nutrient Components Product Information," http://www.sapporobeer.jp/product/nutrition/index.html, retrieved 2017, (see partial English translation).
"Story of Alcohols," Shurui Sogo Kenkyusho Johoshi, No. 9, 1-7 (2016) (see partial English translation).
Components of Brewed Products, The Brewing Society of Japan, 196-197 (1999) (see partial English translation).
International Preliminary Report on Patentability and Written Opinion issued in corresponding International Patent Application No. PCT/JP2017/024132 dated Apr. 11, 2019.
"GNPD—Platinum Clear Beer, ID# 4182633, posted in Jun. 2016, [retrieved on Apr. 15, 2020]", 2016 (see partial English translation).

* cited by examiner

*Primary Examiner* — Bhaskar Mukhopadhyay
(74) *Attorney, Agent, or Firm* — Morgan, Lewis & Bockius LLP

(57) ABSTRACT

The present invention relates to a beer-taste beverage having a malt ratio in materials of 66.6% by mass or less, a protein content greater than 0.31 g/100 ml, and sugars content of 2.5 g/100 ml or less.

11 Claims, No Drawings

BEER-FLAVORED BEVERAGE, METHOD FOR PRODUCING BEER-FLAVORED BEVERAGE, AND METHOD FOR IMPARTING EXCELLENT RICHNESS AND QUALITY OF AFTERTASTE TO BEER-FLAVORED BEVERAGE

TECHNICAL FIELD

The present invention relates to a beer-taste beverage, a method for producing a beer-taste beverage, and a method for imparting good fullbodied taste and aftertaste quality to a beer-taste beverage.

BACKGROUND ART

In recent years, beer-taste beverages such as Happoushu and liqueur have been widely consumed due to diversification of tastes of consumers. Various methods for improving the flavor of beer-taste beverages have been reported along with increased consumption of such beer-taste beverages. For example, Patent Literature 1 discloses a beer-taste beverage containing a water-soluble dietary fiber and a certain amount of a high-intensity sweetener as a method of enhancing body while maintaining sharpness of beer-taste beverage.

On the other hand, the demand for beer-taste beverages with low sugars content has been increasing due to recent increase in health consciousness.

CITATION LIST

Patent Literature

Patent Literature 1: Japanese Unexamined Patent Publication No. 2014-166169

SUMMARY OF INVENTION

Technical Problem

However, low sugars beer-taste beverages having a low malt ratio in materials had insufficient fullbodied taste and aftertaste quality (firm aftertaste and low astringent taste). The present invention has been made in view of the above circumstances, and it is an object of the present invention to provide a beer-taste beverage having good fullbodied taste and aftertaste quality while having low sugars.

Solution to Problem

The present invention provides a beer-taste beverage having a malt ratio in materials of 66.6% by mass or less, a protein content greater than 0.31 g/100 ml, and sugars content of 2.5 g/100 ml or less. The beer-taste beverage of the present invention has good fullbodied taste and aftertaste quality by having the above constitution.

In the beer-taste beverage, the malt ratio in the materials is preferably less than 50% by mass. This makes the fullbodied taste and aftertaste quality of beer taste better.

In the beer-taste beverage, an extract content is preferably 2.0 w/v % or more. This makes the fullbodied taste and aftertaste quality of beer taste better.

It is preferred that the beer-taste beverage does not use dietary fiber as a material. This makes the aftertaste quality better.

In the beer-taste beverage, alcohol by volume is preferably 1 v/v % or more. This secures an alcoholic feeling as a beer-taste beverage.

The present invention also provides a method for producing a beer-taste beverage, the method including adjusting so that a protein content of the beer-taste beverage is greater than 0.31 g/100 ml and sugars content of the beer-taste beverage is 2.5 g/100 ml or less, using a material having a malt ratio of 66.6% by mass or less.

The present invention also provides a method for imparting good fullbodied taste and aftertaste quality to a beer-taste beverage having a malt ratio in the materials of 66.6% by mass or less, including adjusting so that a protein content of the beer-taste beverage is greater than 0.31 g/100 ml and adjusting so that sugars content of the beer-taste beverage is 2.5 g/100 ml or less.

Advantageous Effects of Invention

According to the present invention, it is possible to provide a beer-taste beverage having good fullbodied taste and aftertaste quality while having low sugars, and a method for producing the same. Also, according to the present invention, it is possible to provide a beer-taste beverage in which stickiness of sweet is suppressed. Further, according to the present invention, it is possible to provide a method for imparting good fullbodied taste and aftertaste quality to a beer-taste beverage having a malt ratio in the materials of 66.6% by mass or less.

DESCRIPTION OF EMBODIMENTS

Embodiments for carrying out the present invention will be described in detail below. The present invention is not limited to the following embodiments.

In the present specification, the term "material" means other than water and hops, among all materials used for the production of beer-taste beverages determined under the Liquor Tax Act (Act No. 16 of Mar. 31, 2016).

In the present specification, the term "about" indicates a numerical value within a range of ±5%.

In the beer-taste beverage according to the present embodiment, the malt ratio in the materials is 66.6% by mass or less, the protein content is greater than 0.31 g/100 ml, and the sugars content is 2.5 g/100 ml or less.

In the present specification, the beer-taste beverage means a beverage having a beer-like flavor. The beer-taste beverage may be a beer-taste alcoholic beverage having alcohol by volume of 1 v/v % or more, or may be a non-alcoholic beer-taste beverage having alcohol by volume of less than 1 v/v %. The beer-taste beverage according to the present embodiment is preferably a beer-taste alcoholic beverage having alcohol by volume of 1 v/v % or more, from the viewpoint of securing an alcoholic feeling as a beer-taste beverage. In the present specification, the alcohol means ethanol unless otherwise specified.

Examples of the beer-taste alcoholic beverage include those that are classified as Happoushu, other sparkling alcoholic beverages and liqueur based on the Liquor Tax Act (Act No. 16 of Mar. 31, 2016).

The lower limit of alcohol by volume of the beer-taste alcoholic beverage may be, for example, 1 v/v % or more, 2 v/v % or more, 3 v/v % or more, 4 v/v % or more, or 5 v/v % or more. In addition, the upper limit of alcohol by volume of the beer-taste alcoholic beverage may be, for example, 20 v/v % or less, 15 v/v % or less, 10 v/v % or less, 9 v/v % or less, 8 v/v % or less, 7 v/v % or less, 6 v/v % or less, 5 v/v % or less, 4 v/v % or less, or 3 v/v % or less.

The non-alcoholic beer-taste beverage is a beer-taste beverage which is substantially free of alcohol. Alcohol by volume of the non-alcoholic beer-taste beverage may be less than 1 v/v %, may be 0.5 v/v % or less, may be 0.1 v/v % or less, or may be less than 0.005 v/v % (0.00 v/v %).

The beer-taste beverage according to the present embodiment may be sparkling or non-sparkling. The beer-taste beverage according to the present embodiment is preferably sparkling. In the present specification, sparkling means that the gas pressure at 20° C. is 0.049 MPa (0.5 kg/cm$^2$) or more, and non-sparkling means that the gas pressure at 20° C. is less than 0.049 MPa (0.5 kg/cm$^2$). In the case of sparkling, the upper limit of the gas pressure may be about 0.294 MPa (3.0 kg/cm$^2$) or may be about 0.235 MPa (2.4 kg/cm$^2$).

In the beer-taste beverage according to the present embodiment, the material may contain a mugi material.

In the present specification, mugi material refers to mugi or mugi products. Examples of mugi include barley, wheat, lye, oat, and adlay. Examples of the mugi products include mugi extracts, malt, and malt extracts. The mugi extracts can be obtained by extracting mugi extracts containing sugars and nitrogen from mugi. The malt can be obtained by germinating mugi. The malt extracts can be obtained by extracting extracts containing sugars and nitrogen from the malt. A single mugi material may be used, or plural mugi materials may be used in combination.

In the beer-taste beverage according to the present embodiment, the ratio of mugi material in the materials may be 50% by mass or more, 66% by mass or more, 67% by mass or more, 70% by mass or more, 80% by mass or more, 90% by mass or more, 95 mass % or more, 99% by mass or more, or 100% by mass. When the ratio of mugi material in the materials is within the above range, fullbodied taste and aftertaste quality of the beer-taste beverage become better.

In the beer-taste beverage according to the present embodiment, the malt ratio in the materials may be 66.6% by mass or less, or may be less than 50% by mass or less than 25% by mass. When the malt ratio in the materials is in the above range, fullbodied taste and aftertaste quality of the beer-taste beverage become better.

In the beer-taste beverage according to the present embodiment, the material may contain something other than the mugi materials. Materials other than the mugi materials may be, for example, plant materials such as cereals such as corn, rice and kaoliang; potatoes such as potato and sweet potato; and beans such as soybeans and peas, and may be sugars materials (saccharides) such as starch, grits, and liquid sugar. In the beer-taste beverage according to the present embodiment, it is preferable not to use a plant material other than the mugi materials as a material, from the viewpoint of securing more rich taste. In addition, in the beer-taste beverage according to the present embodiment, it is preferable not to use sugars materials (saccharides) as materials, from the viewpoint of suppressing stickiness of sweet. Furthermore, in the beer-taste beverage according to the present embodiment, it is preferable not to use a plant material and a sugars material (saccharide) other than the mugi materials as a material, from the viewpoint of securing more rich taste and suppressing stickiness of sweet.

In the beer-taste beverage according to the present embodiment, the protein content is greater than 0.31 g/100 ml. The protein content can be determined by a method for determining total nitrogen (protein) by the improved Dumas method.

The protein content of the beer-taste beverage according to the present embodiment may be 0.35 g/100 ml or more, 0.40 g/100 ml or more, 0.45 g/100 ml or more, 0.50 g/100 ml or more, 0.55 g/100 ml or more, or 0.60 g/100 ml or more. The protein content of the beer-taste beverage according to the present embodiment may be 3.00 g/100 ml or less, 2.50 g/100 ml or less, 2.30 g/100 ml or less, 2.00 g/100 ml or less, 1.80 g/100 ml or less, 1.50 g/100 ml or less, 1.30 g/100 ml or less, 1.00 g/100 ml or less, 0.90 g/100 ml or less, 0.85 g/100 ml or less, 0.80 g/100 ml or less, 0.75 g/100 ml or less, or 0.70 g/100 ml or less. When the protein content is in the above range, fullbodied taste and aftertaste quality of the beer-taste beverage become better. The protein content can be adjusted according to the amount of enzyme added, the type and amount of materials used, and the like.

The beer-taste beverage according to the present embodiment may contain a protein separately used as a material, in addition to an enzyme and a protein derived from a plant material. Examples of such protein include wheat proteins, soybean proteins, pea proteins, and the like, or proteolytic products thereof, and the like. In the beer-taste beverage according to the present embodiment, it is preferable not to use collagen as a material from the viewpoint of making the aroma of the beer-taste beverage good.

In the beer-taste beverage according to the present embodiment, the sugars content is 2.5 g/100 ml or less. In the present specification, the sugars refer to sugars based on the nutrition labeling standards for food (Ministry of Health, Labor and Welfare Notification No. 176, 2003). Specifically, sugars refer to a product obtained by removing proteins, lipids, dietary fibers, ash, moisture and alcohol from foods. The sugars content in a beer-taste beverage is calculated by subtracting amounts of protein, lipid, dietary fiber, ash, moisture and alcohol from the weight of the beer-taste beverage. The amounts of protein, lipid, ash, and moisture are measured by the methods listed in the nutrition labeling standards. The amount of alcohol can be measured together with the amount of moisture. Specifically, the amount of protein can be determined by the method for determining total nitrogen (protein) by the improved Dumas method, and the amount of lipid can be determined by an ether extraction method, chloroform/methanol mixed solution extraction method, Gerber method, acid hydrolysis method or Roese Gottlieb method, the amount of dietary fiber can be determined by high-performance liquid chromatography or Prosky method, and the amount of ash can be determined by a magnesium acetate added ashing method, direct ashing method or sulfuric acid added ashing method, and the amounts of moisture and alcohol can be determined by Karl Fischer method, a drying aid method, reduced pressure heating drying method, a normal pressure heating and drying method or plastic film method.

The sugars content of the beer-taste beverage according to the present embodiment may be 2.5 g/100 ml or less, 2.3 g/100 ml or less, 2.0 g/100 ml or less, 1.8 g/100 ml or less, 1.7 g/100 ml, or 1.6 g/100 ml or less. Also, the sugars content of the beer-taste beverage according to the present embodiment may be 0.1 g/100 ml or more, 0.2 g/100 ml or more, 0.3 g/100 ml or more, 0.4 g/100 ml or more, 0.5 g/100 ml or more, 1.0 g/100 ml or more, 1.2 g/100 ml or more, or 1.3 g/100 ml or more. When the sugars content is within the above range, stickiness of sweet is further suppressed. The sugars content can be adjusted according to the amount of enzyme added, the type and amount of materials used, or the like.

The dietary fiber content of the beer-taste beverage according to the present embodiment may be less than 1.0 g/100 ml, less than 0.7 g/100 ml, less than 0.5 g/100 ml, less than 0.3 g/100 ml, or less than 0.2 g/100 ml. The dietary fiber content can be determined by high-performance liquid chromatography or Prosky method. The dietary fiber content can be adjusted according to the type and amount of materials used.

The beer-taste beverage according to the present embodiment may contain dietary fiber separately used as a material, in addition to dietary fiber derived from a plant material. Examples of such a dietary fiber include digestion resistant dextrin. In the beer-taste beverage according to the present embodiment, it is preferable not to use dietary fiber as a material from the viewpoint that aftertaste quality becomes better.

The extract content of the beer-taste beverage according to the present embodiment may be 1.0 w/v % or more, 1.3 w/v % or more, 1.5 w/v % or more, 1.8 w/v % or more, 2.0 w/v % or more, or 2.2 w/v % or more. Further, the extract content of the beer-taste beverage according to the present embodiment may be 4.0 w/v % or less, 3.0 w/v % or less, or 2.5 w/v % or less. When the extract content is in the above range, fullbodied taste and aftertaste quality of the beer-taste beverage become better. In the present specification, an extract refers to a nonvolatile solid content composed of sugars (carbohydrate), protein, amino acid, bitter substance, nonvolatile organic acid, mineral, polyphenol, pigment component, and the like. The extract content can be determined by a method described in "8.4 Authentic (real) extract" of revised BCOJ beer analysis method (published by Brewing Society of Japan, edited by Brewery Convention of Japan, Brewers Association of Japan [Analysis Committee], revised and enlarged in 2013). The extract content can be adjusted according to the amount of enzyme added, the type and amount of materials or the like. In the beer-taste beverage according to the present embodiment, it is preferable not to use yeast extract as a material from the viewpoint of not bringing an aroma peculiar to yeast extract to the beer-taste beverage.

The beer-taste beverage according to the present embodiment may contain 4-vinylguaiacol (4-vinyl-2-methoxyphenol; 4-VG). When the beer-taste beverage contains 4-vinylguaiacol, the concentration thereof is preferably 0.3 ppm or more, and more preferably 0.8 ppm or more. When the concentration of 4-vinylguaiacol is in the above range, the aroma of the beer-taste beverage becomes better. The concentration of 4-vinylguaiacol can be measured using a gas chromatograph mass spectrometer (GC-MS) based on a solid phase microextraction (SPME) method. Incidentally, it is preferable to perform determination by standard addition method. The concentration of 4-vinylguaiacol can be adjusted according to the type and amount of materials or the like.

The beer-taste beverage according to the present embodiment may contain isoamyl acetate. When the beer-taste beverage contains isoamyl acetate, the concentration thereof is preferably 4.0 ppm or more. When the concentration of isoamyl acetate is in the above range, the aroma of the beer-taste beverage becomes better. The concentration of isoamyl acetate can be determined by a method described in "8.22 Low boiling aroma component" of revised BCOJ beer analysis method (published by Brewing Society of Japan, edited by Brewery Convention of Japan, Brewers Association of Japan [Analysis Committee], revised and enlarged in 2013). The concentration of isoamyl acetate can be adjusted according to the amount of enzyme added, the type and amount of materials or the like.

The beer-taste beverage according to the present embodiment may contain additives such as coloring agents, high-intensity sweeteners, antioxidants, flavoring agents, acidulants and salts, which are usually blended in beverages. From the viewpoint of realizing the taste of a purer beer-taste beverage, the beer-taste beverage according to the present embodiment preferably does not contain a high-intensity sweetener.

The beer-taste beverage according to the present embodiment can be provided in a container. The container only has to be a hermetically sealable one, and it is possible to use so-called can containers made of metal (such as aluminum or steel) or barrel containers. Further, it is also possible to use glass containers, PET bottle containers, paper containers, pouch containers or the like. Volume of the container is not particularly limited, and it is possible to use any one currently in circulation. The container made of metal is preferably used, in view of completely blocking gas, moisture, and light rays and maintaining stable quality at ambient temperature for long periods.

The beer-taste beverage according to the present embodiment can be produced according to a conventional method, except for adjusting so that the protein content in the beer-taste beverage is greater than 0.31 g/100 ml and the sugars content is 2.5 g/100 ml or less using a material having a malt ratio of 66.6% by mass or less, as described above.

The beer-taste beverage according to the present embodiment can be produced, for example, through a preparing process of mixing a mugi material and water, and enzymes and various additives as necessary, saccharifying the mugi material, and as necessary, subjecting a wort obtained by filtering the saccharified solution to addition of hops, boiling, cooling or the like to obtain a pre-fermentation solution, and a fermentation process of adding beer yeast to the pre-fermentation solution to perform fermentation. In addition, as a post-fermentation process after the fermentation process, filtration, heating (sterilization), addition of alcohol, carbonation and the like may be performed on the post-fermentation liquid obtained in the fermentation process.

As the enzyme added in the preparing process, for example, polysaccharide degrading enzymes (e.g., α-amylase, β-amylase, pullulanase, glucoamylase, α-glucosidase, isoamylase, cellulase (including β-glucanase), hemicellulase), and proteolytic enzymes (proteases) can be used. A single enzyme may be used, or plural enzymes may be used in combination.

As the hops added in the preparing process, for example, dry hops, hop pellets, and hop extracts can be used. The hops may be hop products such as raw hop, hexahop, tetrahop, and isohop extract.

As alcohol to be added in the post-fermentation process, for example, spirits can be used, among which barley spirits are preferable. In one embodiment, the beer-taste beverage may include spirits (preferably, barley spirits).

The beer-taste beverage according to the present embodiment exhibits an effect of having good fullbodied taste and aftertaste quality. Therefore, as an embodiment of the present invention, there is provided a method for imparting good fullbodied taste and aftertaste quality to a beer-taste beverage having a malt ratio in materials of 66.6% by mass or less, including adjusting so that the protein content in the beer-taste beverage is greater than 0.31 g/100 ml and the sugars content in the beer-taste beverage is 2.5 g/100 ml or less.

EXAMPLES

Hereinafter, the present invention will be described more specifically based on examples. The present invention is not limited to the following examples.

Production Example: Production of Beer-Taste Beverage (Production of Beer-Taste Beverage (Liquid A))

Materials containing a crushed mugi material (the malt ratio of about 50% by mass, the remainder being crushed barley), water, and 0.57% by mass of a polysaccharide degrading enzyme based on the crushed barley were charged into a preparation tank, and a saccharified solution was produced according to a conventional method. The obtained saccharified solution was filtered to obtain wort. Hops were added to the obtained wort, and the mixture was boiled, and cooled after separating and removing the precipitate. Beer yeast was added to the obtained pre-fermentation solution (cold wort) and fermented for a predetermined period of time to produce a beer-taste beverage (Liquid A) having alcohol by volume of about 5 v/v %.

(Production of Beer-Taste Beverage (Liquid B))

A beer-taste beverage (Liquid B) having a concentration of alcohol of about 5 v/v % was produced, in the same conditions as in the production of the beer-taste beverage (Liquid A), except that 0.13% by mass of a proteolytic enzyme (protease) based on the crushed barley was further charged in the preparing process.

(Production of Beer-Taste Beverage (Liquid C))

A beer-taste beverage (liquid C) having alcohol by volume of about 5 v/v % was produced, in the same conditions as in the production of the beer-taste beverage (Liquid A), except that 0.15% by mass of a proteolytic enzyme (protease) based on the crushed barley was further charged in the preparing process.

(Production of Beer-Taste Beverage (Liquid D))

Materials containing a crushed mugi material (the malt ratio of about 25% by mass, the remainder being crushed barley), water, and 0.57% by mass of a polysaccharide degrading enzyme based on the crushed barley were charged into a preparation tank, and a saccharified solution was produced according to a conventional method. The obtained saccharified solution was filtered to obtain wort. Hops were added to the obtained wort, and the mixture was boiled, and cooled after separating and removing the precipitate. Beer yeast was added to the obtained pre-fermentation solution (cold wort) and fermented for a predetermined period of time to produce a beer-taste beverage (Liquid D) having alcohol by volume of about 5 v/v %.

(Production of Beer-Taste Beverage (Liquid E))

A beer-taste beverage (Liquid E) having alcohol by volume of about 5 v/v % was produced, in the same conditions as in the production of the beer-taste beverage (Liquid D), except that 0.13% by mass of a proteolytic enzyme (protease) based on the crushed barley was further charged in the preparing process.

(Production of Beer-Taste Beverage (Liquid F))

Materials containing a crushed mugi material (the malt ratio of about 50% by mass, the remainder being crushed barley), water, and 0.0875% by mass of a polysaccharide degrading enzyme based on the crushed barley were charged into a preparation tank, and a saccharified solution was produced according to a conventional method. The obtained saccharified solution was filtered to obtain wort. Hops were added to the obtained wort, and the mixture was boiled, and cooled after separating and removing the precipitate. Beer yeast was added to the obtained pre-fermentation solution (cold wort) and fermented for a predetermined period of time to produce a beer-taste beverage (Liquid F) having alcohol by volume of about 5.75 v/v %.

(Measurement of Protein Amount and Calculation of Sugars Amount)

The amounts of moisture, alcohol, protein and ash of each of the obtained beer-taste beverage were measured, respectively. Moisture and alcohol were measured by a normal pressure heating and drying method. The protein amount was measured by a method for determining total nitrogen (protein) by the improved Dumas method. The ash amount was measured by direct ashing method. Considering the amount of lipid in the beer-taste beverage as 0 g/100 ml and the amount of dietary fiber as 0 g/100 ml, the value obtained by subtracting the amounts of moisture, alcohol, protein and ash from the weight of the beer-taste beverage was calculated as the sugars amount (g/100 ml) of the beer-taste beverage.

Test Example 1: Preparation and Evaluation of Beer-Taste Beverage (1)

(Preparation and Sensory Evaluation of Samples)

For Liquid A as Sample 1-1, Liquid A and Liquid C mixed in a volume ratio of 3:1 as Sample 1-2, Liquid A and Liquid C mixed in a volume ratio of 1:1 as Sample 1-3, Liquid B as Sample 1-4, Liquid C as Sample 1-5, Liquid D as Sample 1-6, and Liquid E as Sample 1-7, each sample was subjected to sensory evaluation by four trained panelists. The sensory evaluation was conducted in 5 levels (5: good to 1: insufficient) on the evaluation items of fullbodied taste and aftertaste quality (firm aftertaste and low astringent taste), and the average value was taken as the evaluation score. A sample having an evaluation score exceeding 2 is evaluated as having good fullbodied taste or aftertaste quality without problems in practical use. The results are shown in Table 1. The concentration of 4-vinylguaiacol in Sample 1-5 was 0.8 ppm.

TABLE 1

| | | Sample | | | | | |
|---|---|---|---|---|---|---|---|
| | 1-1 | 1-2 | 1-3 | 1-4 | 1-5 | 1-6 | 1-7 |
| Malt ratio in materials (% by mass) | About 50 | About 50 | About 50 | About 50 | About 50 | About 25 | About 25 |
| Protein (g/100 ml) | 0.31 | 0.41 | 0.51 | 0.63 | 0.71 | 0.28 | 0.66 |
| Sugars (g/100 ml) | 1.78 | 1.69 | 1.59 | 1.37 | 1.40 | 1.68 | 1.30 |
| Extract content (w/v %) | 2.40 | 2.39 | 2.38 | 2.28 | 2.35 | 2.27 | 2.24 |
| Isoamyl acetate (ppm) | 3.3 | 3.5 | 3.6 | 4.4 | 3.9 | 3.5 | 4.6 |
| Sensory evaluation Fullbodied taste | 1.75 | 2.75 | 3.75 | 4.25 | 4.25 | 2.5 | 4 |
| Aftertaste quality | 2.25 | 3.25 | 4.75 | 4.25 | 4 | 2 | 4 |

Sample 1-1 having a protein content of 0.31 g/100 ml had insufficient fullbodied taste in a sample having a malt ratio in the materials of about 50% by mass, whereas Samples 1-2 to 1-5 having a protein content greater than 0.31 g/100 ml had good fullbodied taste and aftertaste quality. In particular, Samples 1-3 to 1-5 having a protein content in the range of 0.51 to 0.70 g/100 ml had excellent fullbodied taste and aftertaste quality.

For the sample having a malt ratio in the materials of about 25% by mass, Sample 1-6 having a protein content of 0.28 g/100 ml had insufficient aftertaste quality, whereas Sample 1-7 having 0.66 g/100 ml had good fullbodied taste and aftertaste quality.

Test Example 2: Preparation and Evaluation of Beer-Taste Beverage (2)

(Preparation and Sensory Evaluation of Samples)

For Liquid B as Sample 2-1, Liquid B and Liquid F mixed in a volume ratio of 84:16 as Sample 2-2, Liquid B and Liquid F mixed in a volume ratio of 77:23 as Sample 2-3, Liquid B and Liquid F mixed in a volume ratio of 6:4 as Sample 2-4, and Liquid B and Liquid F mixed in a volume ratio of 45:55 as Sample 2-5, each sample was subjected to sensory evaluation by four trained panelists. The sensory evaluation was conducted in 5 levels (5: good to 1: insufficient) on the evaluation items of fullbodied taste and absence of stickiness of sweet, and the average value was taken as the evaluation score. A sample having an evaluation score exceeding 2 is evaluated as having good fullbodied taste or suppressed stickiness of sweet without problems in practical use. The results are shown in Table 2.

TABLE 2

|  | Sample | | | | |
| --- | --- | --- | --- | --- | --- |
|  | 2-1 | 2-2 | 2-3 | 2-4 | 2-5 |
| Malt ratio in materials (% by mass) | About 50 | About 50 | About 50 | About 50 | About 50 |
| Protein (g/100 ml) | 0.63 | 0.60 | 0.59 | 0.56 | 0.53 |
| Sugars (g/100 ml) | 1.37 | 1.82 | 2.02 | 2.49 | 2.92 |
| Extract content (w/v %) | 2.28 | 2.70 | 2.89 | 3.34 | 3.74 |
| Isoamyl acetate (ppm) | 4.4 | 4.0 | 3.9 | 3.5 | 3.2 |
| Sensory evaluation Fullbodied taste | 4.25 | 3.75 | 4 | 4 | 4 |

TABLE 2-continued

|  | Sample | | | | |
| --- | --- | --- | --- | --- | --- |
|  | 2-1 | 2-2 | 2-3 | 2-4 | 2-5 |
| Absence of stickiness of sweet | 4.75 | 4.5 | 3 | 2.25 | 1.5 |

Samples 2-1 to 2-4 having sugars content of 2.5 g/100 ml or less in a beer-taste beverage having a protein content in the range of 0.53 to 0.63 g/100 ml had good fullbodied taste, and stickiness of sweet was suppressed. On the other hand, Sample 2-5 having sugars content greater than 2.5 g/100 ml had good fullbodied taste but stickiness of sweet was felt.

The invention claimed is:

1. A beer-taste beverage comprising
   protein and sugars,
   the protein content being 0.41 g/100 ml or more based on a total amount of the beverage, and
   the sugars content being from 1.0 to 2.5 g/100 ml based on a total amount of the beverage,
   wherein the beer-taste beverage is prepared from a material having a malt ratio of 66.6% by mass or less.

2. The beer-taste beverage according to claim 1, wherein the malt ratio in the materials is less than 50% by mass.

3. The beer-taste beverage according to claim 1, wherein no dietary fiber is in the material.

4. The beer-taste beverage according to claim 1, wherein alcohol by volume is 1 v/v % or more.

5. The beer-taste beverage according to claim 1, wherein the protein content is 3.00 g/100 ml or less based on a total amount of the beverage.

6. The beer-taste beverage according to claim 1, wherein the beer-taste beverage has alcohol by volume of 5 v/v % or more.

7. The beer-taste beverage according to claim 1, wherein the beer-taste beverage is non-alcoholic.

8. The beer-taste beverage according to claim 1, wherein the beer-taste beverage is sparkling.

9. The beer-taste beverage according to claim 1, wherein the material comprises mugi material.

10. The beer-taste beverage according to claim 1, wherein the beer-taste beverage has a dietary fiber less than 1.0 g/100 ml.

11. The beer-taste beverage according to claim 1, wherein the beer-taste beverage comprises isoamyl acetate.

* * * * *